United States Patent [19]
Johnson

[11] Patent Number: 5,161,932
[45] Date of Patent: Nov. 10, 1992

[54] ROLLER STORAGE SYSTEM

[76] Inventor: David L. Johnson, 502 Reynolds St., Grand Rapids, Minn. 55744

[21] Appl. No.: 245,638

[22] Filed: Sep. 19, 1988

[51] Int. Cl.⁵ .................................................. B60B 29/00
[52] U.S. Cl. ..................................... 414/430; 280/79.4
[58] Field of Search ................. 414/430, 426; 280/79.4

[56] References Cited

U.S. PATENT DOCUMENTS

| | | | |
|---|---|---|---|
| 806,599 | 12/1905 | Thibault | 414/430 |
| 1,487,584 | 3/1924 | McCarthy | 280/79.4 |
| 2,389,584 | 11/1945 | Acker | 414/430 X |
| 2,552,804 | 5/1951 | Morris | 414/430 |
| 2,610,750 | 9/1952 | Hulbert | 414/430 |
| 3,285,447 | 11/1966 | Junion | 414/430 X |
| 3,603,467 | 9/1971 | Siler | 414/430 |

FOREIGN PATENT DOCUMENTS

| | | | |
|---|---|---|---|
| 1322043 | 2/1963 | France | 280/79.4 |
| 6716567 | 6/1969 | Netherlands | 414/430 |
| 814122 | 5/1959 | United Kingdom | 280/79.4 |

*Primary Examiner*—Robert P. Olszewski
*Assistant Examiner*—Cheryl L. Gastineau
*Attorney, Agent, or Firm*—Burd, Bartz & Gutenkauf

[57] ABSTRACT

A roller storage system for facilitating storage of wheeled vehicles such as automobiles, boat or snowmobile trailers, farm equipment, and the like in otherwise inaccessible locations. The storage system involves the use of a low ramp-like truck or dolly for each wheel of the vehicle. The ramp has side walls and an end backstop wall. It is supported on opposite sides by longitudinally extending rollers located so that their bottom edges extend below the bottom surface of the ramp to permit easy lateral movement on the rollers. The vehicle to be stored is driven adjacent to the otherwise inaccessible storage area. A truck or dolly is located forward of each wheel and the vehicle is driven or pushed onto them and moved laterally into the otherwise inaccessible storage area.

12 Claims, 2 Drawing Sheets

ROLLER STORAGE SYSTEM

BACKGROUND OF THE INVENTION

1. FIELD OF THE INVENTION

This invention is directed to a storage system utilizing a roller mounted ramp for facilitating storage of wheeled vehicles in otherwise inaccessible locations. Boats and snowmobiles, which are commonly transported on trailers, are used for relatively short periods of time each year. The rest of the time they are in storage. The same is true of other vehicles, show cars, autos placed in winter storage, and the like. Many owners do not have storage spaces in which the vehicle may simply be driven in and left. The present invention permits maximum utilization of available space by allowing the vehicle to be moved laterally from its drive-in position.

Similar storage problems exist with respect to small aircraft, agricultural equipment, and the like. A particular problem is faced with the siting of mobile homes and especially the assembly of multi-part mobile homes. Because of trees and other natural obstructions, it is often difficult to locate mobile homes by ordinary transit means.

THE PRIOR ART

Hulbert U.S. Pat. No. 2,610,750 discloses a system utilizing a small truck for each wheel of a vehicle to be moved manually, as for parking. Each of the trucks is provided with four swiveled casters. A hinged incline is provided both to facilitate rolling of the vehicle tire onto the truck and to retain the tired wheel on the truck. A triangular block on the incline member is said to bite into the tire and hold the truck in position against instability to be expected from the use of swivels.

Siler U.S. Pat. No. 3,603,467 discloses a device for lateral movement of a trailer house. It includes a "truckle" adapted to receive the trailer wheels by rolling up an inclined ramp. The truckle is provided with a plurality of wheels rotatable on longitudinal axes. These wheels are power driven. The truckle permits parking of the trailer house in otherwise inaccessible areas.

SUMMARY OF THE INVENTION

The roller storage system according to the present invention utilizes a truck or dolly for the manual lateral movement of wheeled vehicles. That truck or dolly comprises a low ramp for each wheel of the vehicle, the ramp including a longitudinally extending generally flat bottom wall adapted to be closely spaced above a supporting floor surface, a pair of generally vertical low side walls along the opposite edges of the bottom wall, an open front end, and a generally vertical backstop wall at the rear end thereof. A pair of parallel longitudinally extending elongated rollers are journaled for rotation on a pair of parallel longitudinally extending horizontal axes. The rollers support the ramp on opposite sides thereof and are spaced from the ends of the ramp.

BRIEF DESCRIPTION OF THE DRAWINGS

The invention is illustrated by the accompanying drawings in which corresponding parts are identified by the same numerals and in which.

DETAILED DESCRIPTION OF THE PREFERRED EMBODIMENT

Figure 3:
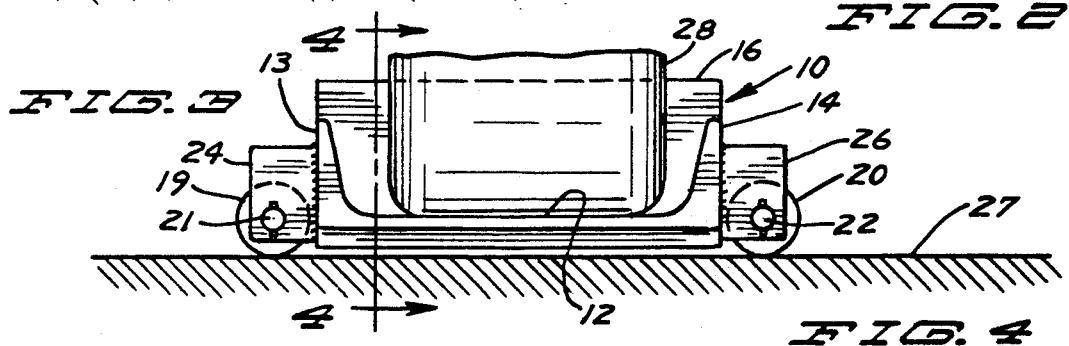
FIG. 3 is a front elevation of the truck or dolly.

Referring now to the drawings, the roller storage system according to the present invention utilizes a truck or dolly, indicated generally at 10, for each wheel of the vehicle to be moved laterally for storage or other purpose. The truck or dolly 10 includes a ramp having a bottom wall 12 of generally flat rectangular configuration, a pair of generally vertical and parallel low wide walls 13 and 14 extending upwardly from the opposite side edges of the bottom wall, an open front, and a generally vertical transverse backstop wall 16 at the rear end of the ramp. As seen in FIG. 3, the inside surfaces of side walls 13 and 14 desirably taper inwardly from the top edges at an angle between about 8° and 12° from vertical, typically about 10°, in order to minimize the possibility of tire damage. The forward edge 17 of the bottom wall 12 is desirably beveled to facilitate entry of a vehicle tire onto the ramp. Desirably a hand hold opening 18 is provided adjacent the forward edge of the ramp bottom wall to facilitate lifting and carrying of the truck or dolly.

The ramp is supported closely spaced above a supporting floor surface by means of a pair of parallel longitudinally extending elongated cylindrical rollers 19 and 20. Rollers 19 and 20 are supported on shafts 21 and 22, respectively, which in turn are supported between pairs of vertical outwardly extending ears or brackets 23-24 and 25-26, respectively, utilizing conventional commercially available bearings to journal the rollers for rotation on a pair of parallel longitudinally extending horizontal axes.

Figure 1:
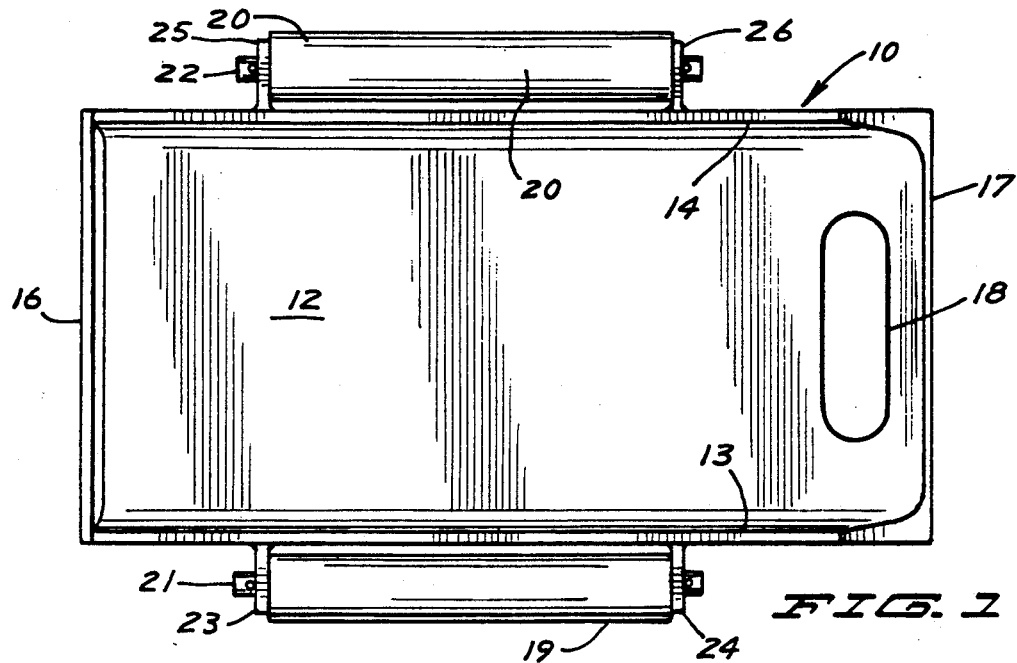
FIG. 1 is a top plan view of a truck or dolly for a vehicle wheel according to the present invention.
Figure 2:
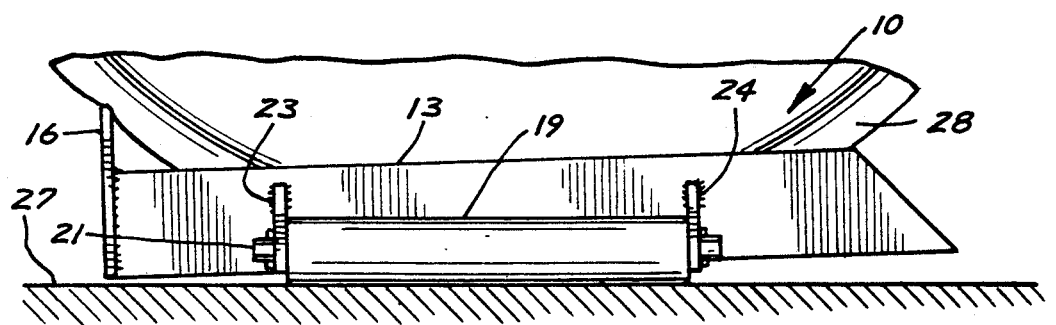
FIG. 2 is a side elevation thereof showing a vehicle wheel in place on the truck or dolly.
Figure 4:
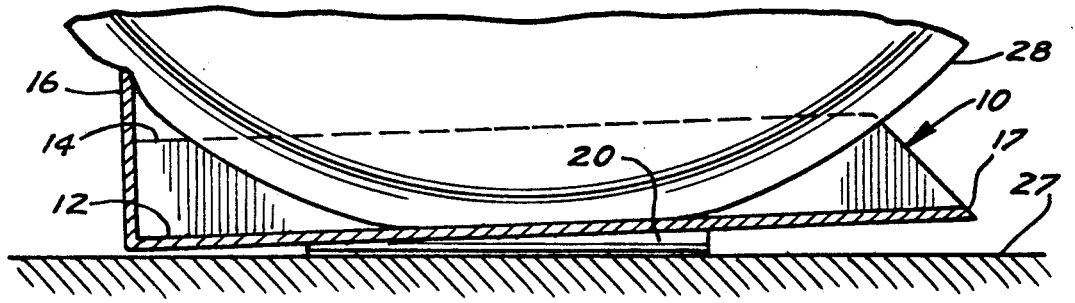
FIG. 4 is an elevation in section on the line 4—4 of FIG. 3 and in the direction of the arrows.

As best seen in FIG. 4, the bottom wall 12 of the ramp is disposed so as to tilt rearwardly at an angle between about 2° and 5°, typically about 3°, relative to the axes of rotation of the rollers. Brackets 23-26 are so located and the diameter of the rollers is such that slight clearance is maintained at all times between the bottom surface of bottom wall 12 and the floor 27 or other supporting surface, except when a vehicle is being loaded onto the ramp. This space typically may be between about 0.25 inch to one inch. As seen in FIGS. 2 and 4, the slight downward and rearward slope of the ramp insures that the edge of the vehicle tire 28 engages the transverse backstop wall 16. This assures maximum stability and insures against the vehicle accidentally rolling off the ramp.

Figure 5:
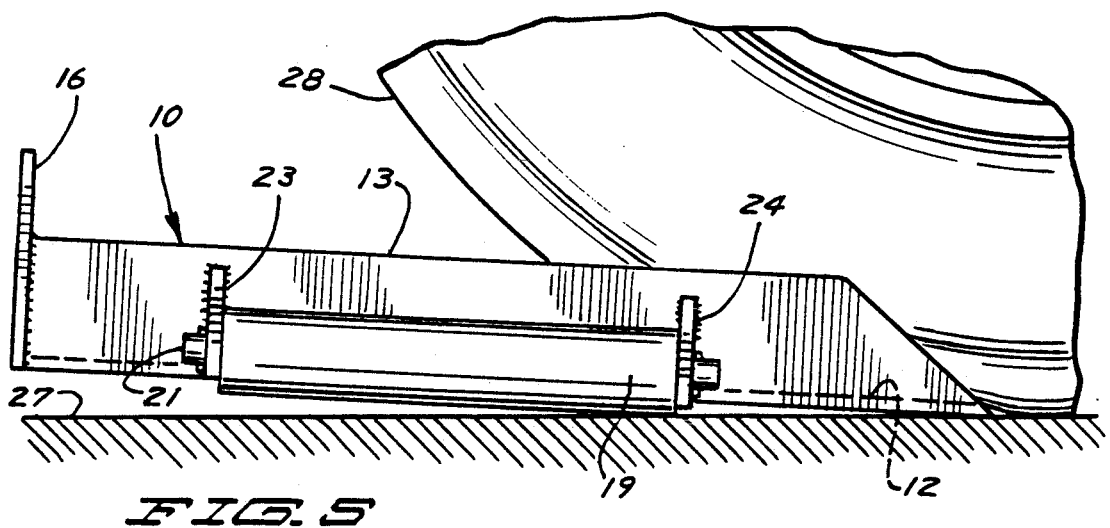
FIG. 5 is a side elevation of a truck or dolly showing a tired vehicle about to be rolled onto the ramp of the truck or dolly.

As best seen in FIG. 5, the ramp is adapted to be tilted downwardly at its front end, using the forward edges of rollers 19 and 20 as a fulcrum, to facilitate loading of a vehicle onto the ramps. The forward edge of a ramp is wedged under the edge of each tire of the vehicle to be stored causing the slight tilting, as shown. Then, as the vehicle is driven or pushed onto all of the ramps, the rollers are restored to full contact with the floor and the ramp bottom wall tilts slightly in the opposite or rearward direction, as shown in FIGS. 2 and 4.

The number of trucks or dollies required to move any given wheeled vehicle is dependent upon the number of wheels, one truck or dolly 10 being provided for each wheel. The size of each ramp is determined by the size of the wheels and tires of the vehicles. Typically the ramp is about 18 to 36 inches in length and about 8 to 15 inches in width. The side walls may be between about 2 and 4 inches in height, typically about 2 to 3 inches. The backstop is somewhat higher than the side walls, typically about 3 to 5 inches. The ramp may be formed from steel plate, channel stock, etc., but preferably, to minimize weight, it is formed from aluminum. The rollers typically are about 8 to 12 inches long and from about 1.5 to 2.5 inches in diameter. The rollers are preferably positioned relative to the ends of the ramp so that, when the vehicle tire is in its storage position as seen in FIGS. 2 and 4, the center line of the axle approximately overlies the midpoint of the length of the rollers.

Figure 6:
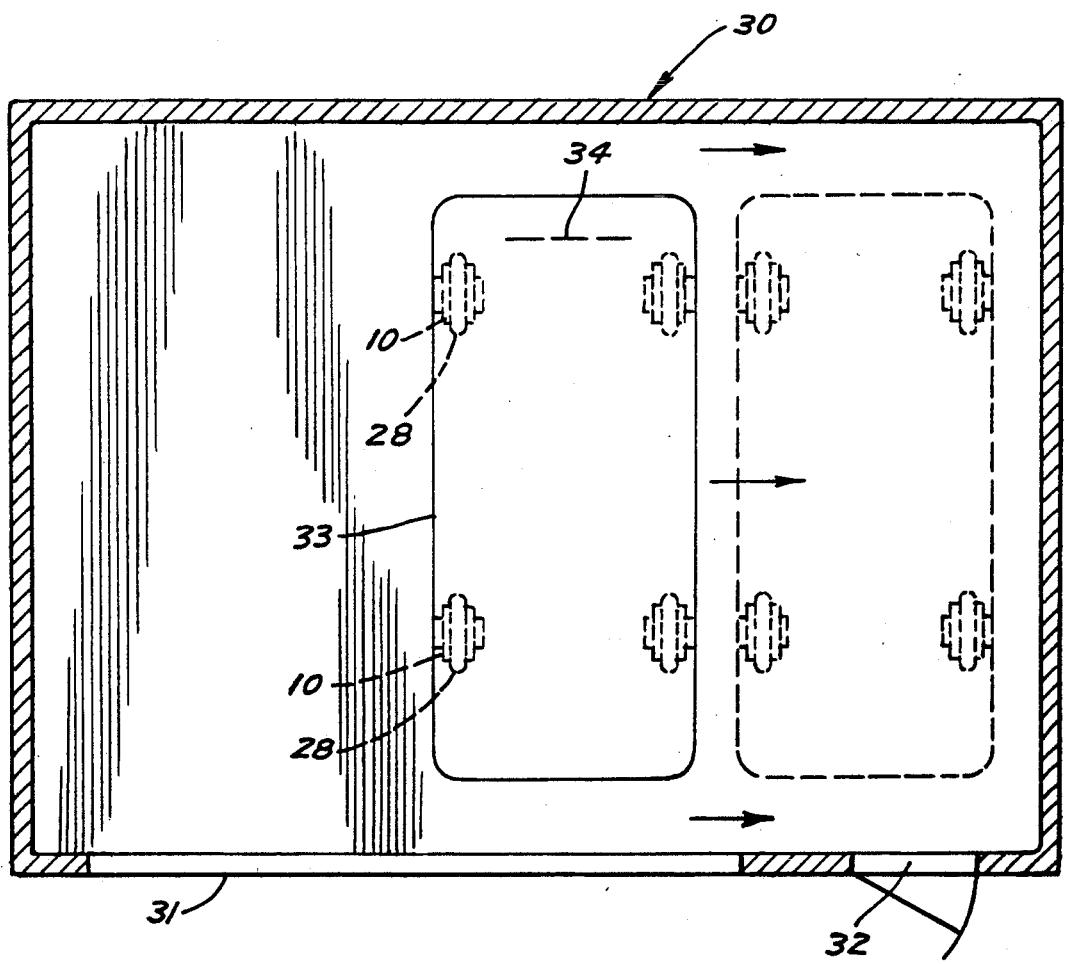
FIG. 6 is a plan view of a typical two car garage with a storage area at one end showing schematically the manner in which the roller system is utilized.

The manner in which the roller storage system is used is illustrated by reference to FIG. 6. There is shown in sectional plan view a typical two car garage, indicated generally at 30, and having a storage area at one end. Access to the drive-in/drive-out parking area is through a double width door opening 31. Access to the storage area is through a smaller door area 32. Because of this, the storage area is not available for storing of large wheeled vehicles such as automobiles, boat trailers, snowmobile trailers, and the like. In order to utilize the storage area for storage of an automobile 33, for example, the automobile is driven into the garage with its front bumper at the position represented by broken line 34 which is approximately the desired storage position of the vehicle relative to the rear wall of the garage minus approximately one-half of the length of each truck or dolly 10. With the vehicle 33 in this initial position, a truck or dolly 10 is positioned in front of each vehicle wheel partially wedged under the tire, as shown in FIG. 5. When each truck or dolly is in place, the vehicle is driven or pushed onto the ramps to the position shown in FIGS. 2 and 4. Then, the vehicle may be pushed manually, supported on rollers 19 and 20, into the otherwise inaccessible storage area. To remove the vehicle from storage, the procedure is reversed.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A truck or dolly for the manual lateral movement of wheeled vehicles which comprises:
   A) a low ramp for each wheel of the vehicle, said ramp including a longitudinally extending generally flat bottom wall adapted to be closely spaced above a supporting floor surface, a pair of generally vertical low parallel side walls along the opposite side edges of the bottom wall, the inside surfaces of said ramp side walls tapering inwardly from the top edges thereof, an open front end and a generally vertical transverse backstop wall at the rear end thereof, and
   B) a pair of parallel longitudinally extending elongated cylindrical rollers journaled for rotation on a pair of parallel longitudinally extending horizontal axes, said rollers supporting said ramp closely spaced above a supporting floor surface, said rollers located on opposite sides of said ramp and spaced from the ends/thereof.

2. A truck or dolly according to claim 1 wherein the bottom wall of said ramp is disposed to tilt downwardly and rearwardly at an angle between about 2° and 5° relative to the axes of rotation of said rollers.

3. A truck or dolly according to claim 2 wherein the bottom wall of said ramp is disposed to tilt downwardly and rearwardly at an angle of about 3° relative to the axes of rotation of said rollers.

4. A truck or dolly according to claim 1 wherein the inside surfaces of said ramp side walls taper inwardly at an angle of about 8° to 12° from vertical from the top edges thereof.

5. A truck or dolly according to claim 1 wherein the edge of said open front end of the ramp is beveled.

6. A truck or dolly according to claim 1 wherein a hand hold opening is provided through the bottom wall of said ramp adjacent to and spaced inwardly from the open front end thereof.

7. A truck or dolly for the manual lateral movement of wheeled vehicles which comprises:
   A) a low ramp for each wheel of the vehicle, said ramp including:
      1) a longitudinally extending generally flat bottom wall adapted to be closely spaced above a supporting floor surface, said bottom wall tilting slightly toward the rear of the ramp,
      2) a pair of generally vertical low side walls along the opposite side edges of the bottom wall, the inside surfaces of said ramp side walls tapering inwardly from the top edges thereof,
      3) an open front end, and
      4) a generally transverse backstop wall at the rearward end thereof, and
   B) a pair of parallel longitudinally extending elongated cylindrical rollers journaled for rotation on a pair of longitudinally extending horizontal axes, said rollers supporting said ramp closely spaced above a supporting floor surface, said rollers being supported on parallel horizontal longitudinally extending shafts each supported in turn between a pair of parallel vertical laterally extending brackets projecting outwardly from the opposite ramp side walls and spaced from the ends thereof.

8. A truck or dolly according to claim 7 wherein the bottom wall of said ramp is disposed to tilt downwardly and rearwardly at an angle between about 2° and 5° relative to the axes of rotation of said rollers.

9. A truck or dolly according to claim 8 wherein the bottom wall of said ramp is disposed to tilt downwardly and rearwardly at an angle of about 3° relative to the axes of rotation of said rollers.

10. A truck or dolly according to claim 7 wherein the inside surfaces of said ramp side walls taper inwardly at an angle of about 8° to 12° from vertical from the top edges thereof.

11. A truck or dolly according to claim 7 wherein the edge of said open front end of the ramp is beveled.

12. A truck or dolly according to claim 7 wherein a hand hold opening is provided through the bottom wall of said ramp adjacent to and spaced inwardly from the open front end thereof.

* * * * *

UNITED STATES PATENT AND TRADEMARK OFFICE
CERTIFICATE OF CORRECTION

PATENT NO. : 5,161,932
DATED : November 10, 1992
INVENTOR(S) : David L. Johnson

It is certified that error appears in the above-indentified patent and that said Letters Patent is hereby corrected as shown below:

On the title page, item [75] Inventor: the inventor's address should read --290 Glenwood Road, Oconomowoc, Wisconsin 63066--.

Signed and Sealed this

Twenty-eighth Day of September, 1993

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,161,932

DATED : November 10, 1992

INVENTOR(S) : David L. Johnson

It is certified that error appears in the above-identified patent and that said Letters Patent is hereby corrected as shown below:

On the title page, item [75] Inventor: the inventor's address should read ---290 Glenwood Road, Oconomowoc, Wisconsin 53066---.

Column 2, line 20 "wide" should be ---side---.

Signed and Sealed this

Tenth Day of May, 1994

Attest:

BRUCE LEHMAN

*Attesting Officer*     *Commissioner of Patents and Trademarks*